United States Patent
Chelcun et al.

(10) Patent No.: US 8,320,089 B1
(45) Date of Patent: Nov. 27, 2012

(54) APPARATUS, METHOD, AND SYSTEM FOR INTEGRATING GROUND FAULT CIRCUIT INTERRUPTERS IN EQUIPMENT-GROUNDED HIGH VOLTAGE SYSTEMS

(75) Inventors: Darrell N. Chelcun, West Dundee, IL (US); John P. Pischl, Yorkville, IL (US)

(73) Assignee: Musco Corporation, Oskaloosa, IA (US)

( * ) Notice: Subject to any disclaimer, the term of this patent is extended or adjusted under 35 U.S.C. 154(b) by 246 days.

(21) Appl. No.: 12/750,377

(22) Filed: Mar. 30, 2010

Related U.S. Application Data

(60) Provisional application No. 61/169,930, filed on Apr. 16, 2009.

(51) Int. Cl.
*H02H 3/16* (2006.01)
(52) U.S. Cl. .............................. 361/42; 361/44
(58) Field of Classification Search ............... 361/42–50
See application file for complete search history.

(56) References Cited

U.S. PATENT DOCUMENTS

| | | | |
|---|---|---|---|
| 3,697,808 A * | 10/1972 | Lee .................................. | 361/46 |
| 4,415,850 A | 11/1983 | Sherwood | |
| 4,472,676 A | 9/1984 | Eichmann et al. | |
| 4,980,125 A | 12/1990 | Haufe et al. | |
| 5,398,478 A | 3/1995 | Gordin et al. | |
| 5,856,902 A * | 1/1999 | Hashimoto et al. ............. | 361/42 |
| 6,327,124 B1 * | 12/2001 | Fearing et al. .................. | 361/31 |
| 6,392,422 B1 | 5/2002 | Kammer et al. | |
| 6,396,284 B1 | 5/2002 | Tisdale et al. | |
| 6,681,110 B1 | 1/2004 | Crookham et al. | |
| 7,046,882 B2 | 5/2006 | Kline | |
| 7,301,739 B2 | 11/2007 | Hamer | |
| 7,889,465 B2 | 2/2011 | Bonilla et al. | |
| 8,163,993 B2 | 4/2012 | Gordin | |
| 2002/0181178 A1 * | 12/2002 | Ortiz et al. ....................... | 361/78 |

OTHER PUBLICATIONS

Bender Incorporated "Ground Fault Circuit Interrupter", http://groundfault.com/gfci/?gclid=CK7uzcj215gCFRwwawodqHjHdA [retrieved from Internet on Apr. 30, 2012], 1 page.
Control Link, Musco Lighting "Flexible control and solid management of your facility—saves operating cost and improves service" brochure, pp. 164-175, copyright 1998. 2007.
"HD-PRO Heavy Duty—High Power", HD-Pro(™) Series, Technology Research Corporation, http://www.trci.net/products/hd-pro, [retrieved from Internet on Apr. 30, 2012], 2 pages.
Lind Equipment "High Power GFCIs and EGFPDs", http://lindequipment.net/main2.cfm?id+2E4FA136-1372-5A65-3B705E51FFB93DB5, [retrieved from Internet on Apr. 30, 2012], 1 pages.
The "Ufer" Ground, http://psihq.com/iread/ufergrnd.htm [retrieved from Internet on Apr. 30, 2012], 4 pages.

* cited by examiner

*Primary Examiner* — Danny Nguyen
(74) *Attorney, Agent, or Firm* — McKee, Voorhees & Sease, P.L.C.

(57) ABSTRACT

An apparatus, method, and system for providing ground fault circuit interrupter (GFCI)-type functionality for electrical systems that may experience leakage current, such as those used in outdoor sports lighting applications, and may benefit from mitigation of electrical shock hazards. The resulting system is such that an equipment-grounded electrical system, where the grounding system is actively monitored, in conjunction with the envisioned GFCI functionality, may comprise an electrical protection system whereby personal injury is minimized.

20 Claims, 10 Drawing Sheets

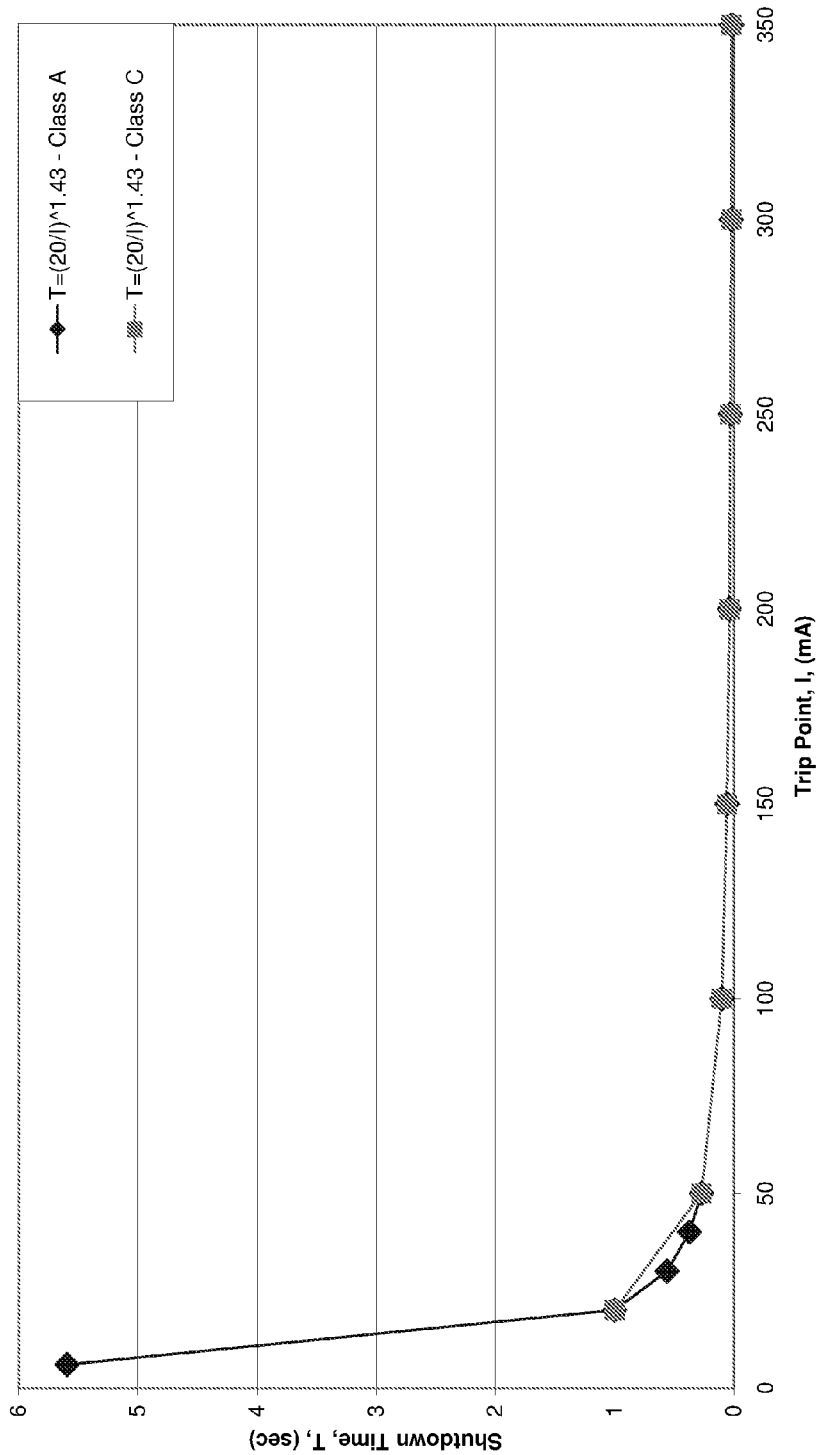

APPARATUS, METHOD, AND SYSTEM FOR INTEGRATING GROUND FAULT CIRCUIT INTERRUPTERS IN EQUIPMENT-GROUNDED HIGH VOLTAGE SYSTEMS

CROSS-REFERENCE TO RELATED APPLICATIONS

This application claims priority under 35 U.S.C. §119 to provisional application Ser. No. 61/169,930 filed Apr. 16, 2009, herein incorporated by reference in its entirety.

I. BACKGROUND OF THE INVENTION

The present invention generally relates to equipment-grounded high voltage systems that may experience leakage current, the means and methods by which the electrical shock hazards from fault current may be mitigated; and a system by which components of said high voltage systems may be monitored, tested, and disabled in response to leakage current such that personal injury is minimized.

It is well known that electrical systems require grounding paths to ensure correct operation of the equipment and to provide a discharge path for leakage and fault current. In addition to providing a path to discharge leakage and fault current, it is desirable for electrical systems to have means by which fault current may be detected and the electrical source disabled in response to some threshold. Ground fault circuit interrupters (GFCIs), most commonly known in use for 120 volt AC circuits and household outlets, are one such means. While GFCI devices are currently in wide use for low voltage systems and more recently higher voltage systems as add-on components, their use has not yet been made integral to equipment-grounded high voltage systems (such as those in sports lighting applications) for a variety of reasons (such as the necessary modifications to make existing GFCI technology applicable to HID lamp systems). Therefore, it is desirable to develop means and methods to provide GFCI functionality to equipment-grounded high voltage electrical systems, particularly those used in sports lighting applications or other applications which use ballast-capacitor-lamp type loads. It is further desirable for said GFCI functionality to be actively controlled and monitored such that faults are accurately identified and shutdown times per governing codes are achieved.

An equipment-grounded high voltage system that may benefit from the aforementioned GFCI functionality, such as the sports lighting system illustrated in FIG. 1A, can generally be characterized by the following.

1. A transformer 10 from the utility company provides electrical power to a service distribution cabinet 30 via a distribution wire 20.
2. Electrical power from service distribution cabinet 30 travels to a control/contactor cabinet 40 via a power line 21.
   a. Note that in subsequent figures power line 21 is shown to be three-phase, however, this is by way of example and not by way of limitation. Single-phase power line electrical systems would likewise benefit from aspects of the invention.
3. Electrical power from control/contactor cabinet 40 travels to a pole cabinet 50 housed on each lighting support structure 60 via power line 21.
4. Electrical power at pole cabinet 50 powers one or more lamps 61, illuminating a field 70.

Earth grounding to protect against adverse electrical effects, such as lightning, may be provided via earth grounds 80 connected to each pole cabinet 50 and may be such as is described in U.S. patent application Ser. No. 12/709,991, incorporated by reference herein. Equipment grounding may be provided via an equipment ground 81 connected to distribution cabinet 30 and via an equipment ground wire 82, and may be such as is described in U.S. patent application Ser. No. 12/559,863 incorporated by reference herein. Remote control capabilities of the electrical system may be enabled by a control center 90. Means and apparatus for remotely controlling operation of the system illustrated in FIG. 1A may be such as is described in U.S. Pat. No. 6,681,110, incorporated by reference herein, and commercially available under the trade name CONTROL-LINK® from Musco Lighting, LLC, Oskaloosa, Iowa, USA. As may be appreciated by one skilled in the art, the currently commercially available CONTROL-LINK® product may differ from that described in U.S. Pat. No. 6,681,110 as the mode of communication between an onsite component and a central server discussed in said patent (e.g. analog cellular signal) may comprise alternate modes of communication (e.g. satellite, Global System for Mobile communications (GSM), Code Division Multiple Access (CDMA), etc.).

As can be seen in FIG. 1A, if fault conditions due to fault current arose in one part of the system, for example at lamp 61 of Pole A, the condition could only be isolated by shutting down the entire electrical system manually at service distribution cabinet 30, remotely by control center 90, or manually at pole cabinet 50 (provided it was safe to do so, which may not be the case due to electrical shock hazards). There is no GFCI-type functionality that would allow lamp 61 to shut down while the rest of the electrical system operated normally. Further, there is no monitoring functionality of the leakage current to determine if it was safe to manually remove power at pole cabinet 50 controlling lamp 61.

Underwriters Laboratories, Inc. (UL) set forth requirements for providing GFCI functionality for systems such as that illustrated in FIG. 1A, however, use of currently available GFCI devices is limited by the lack of prevention of false detection of fault current and disabling of the electrical system, commonly referred to as nuisance tripping. High voltage systems generally have a higher leakage current than low voltage systems which may cause a GFCI device to erroneously detect a fault during normal operation. For example, UL-943 states that for systems up to 150 volt AC from any line voltage to ground (such as the aforementioned 120 volt systems), the minimum fault current to ground threshold (commonly referred to as the minimum trip point) is 6 mA, which is readily achieved with commercially available GFCI devices (whether as add-on components or as part of the circuit). For higher voltages, for example 150-300 volt phase to ground, UL-943C states the minimum trip point is 20 mA if a reliable equipment grounding system is in place; reliable grounding is defined by UL as a grounding system or double insulation system that satisfies U.S. National Electric Code (NEC) 250.110 (6) and 250.114 (2). UL-943C further states that the reliable equipment grounding system must have a ground monitoring function that will prevent more than a 150 volt voltage drop in the grounding circuit. However, for high voltage systems such as that illustrated in FIG. 1A, the 20 mA threshold may be encountered during some phases of normal operation, such as lamp 61 startup, resulting in nuisance tripping. Commercially available GFCI devices do not address this concern.

Also challenging is disabling the electrical system in the desired time constraints. For example, UL-943 states that for systems up to 150 volt AC from any line voltage to ground (such as the aforementioned 120 volt systems) the required time for shutdown at the minimum trip point is 5.59 sec, which is usually readily achieved with commercially available GFCI devices (whether as add-on components or as part of the circuit). For higher voltages, for example 150-300 volt phase to ground, UL-943C states the required time for shutdown at the minimum trip point is 1 sec if a reliable grounding system is in place. However, the required time for shutdown decreases as the trip point increases and for electrical systems carrying 150-300 volt phase to ground, the shutdown time threshold decreased to 20 msec. For conventional high voltage systems such as that illustrated in FIG. 1A, 20 msec does not allow sufficient time for detection of the fault, communication to control/contactor cabinet 40 to shutdown, and shutdown of the desired electrical component; this due in part to the amount of time required to disconnect high voltage devices such as contactors that are common to ballast-capacitor-lamp type loads. Again, commercially available GFCI devices do not address this concern.

II. SUMMARY OF THE INVENTION

The effectiveness of commercially available GFCI devices intended to detect fault current and disable the electrical source in equipment-grounded high voltage systems, such as those in sports lighting applications, is limited by nuisance tripping and the shutdown time required by UL. Further, for higher voltage systems, such as those in sports lighting applications, use of commercially available GFCI devices is limited by the UL-943C requirement for reliable equipment grounding systems and monitoring methods. Therefore, it is useful to develop an apparatus, method, and system to detect trip point conditions in an equipment-grounded high voltage system and disable the electrical source within the time required by the aforementioned governing codes. It is further useful for said apparatus, method, and system to isolate normal operating conditions from actual fault conditions that require action such that nuisance tripping is eliminated. It is further useful for said apparatus, method, and system to be integral to the electrical system such that key functions may be actively controlled and monitored. Still further, it is useful for the said apparatus, method, and system to be integrated with means for ground monitoring (such as that referenced in U.S. patent application Ser. No. 12/559,863) such that the resulting electrical system may provide personal protection, including protection against let-go dangers that exist when the pole voltage to ground rises to 150 volt or higher, while adhering to governing codes for GFCI functionality.

As previously stated, UL-943 states 6 mA is the minimum trip point for systems up to 150 volt AC from any line voltage to ground (Class A GFCI). Using 6 mA as an input into the equation $(T=(20/I)^{1.43})$ that defines the Class A GFCI curve shown in FIG. 2A, the required time for shutdown is 5.59 sec. Per UL-943C, 20 mA is the minimum trip point for systems greater than 150 volt AC but less than 300 volt AC line to ground (Class C GFCI). Using 20 mA as an input into the equation $(T=(20/I)^{1.43})$ that defines the Class C GFCI curve shown in FIG. 2A, the required time for shutdown is 1 sec. Normally, response time would continue to decrease as the trip point increases, however, UL-943C states that the equation that defines the Class C GFCI curve is only valid to 20 msec; as can be seen in FIG. 2B, for Class C GFCI devices, the response time threshold plateaus at 20 msec. Therefore, to design for the most stringent conditions required by UL-943C, a Class C high voltage electrical system such as that illustrated in FIG. 1A must detect a 20 mA fault current to ground condition (i.e. trip point) and shut down the delinquent electrical source in 20 msec.

Apparatus for Class C GFCI functionality integral to equipment-grounded high voltage systems, methods for controlling and monitoring said GFCI functionality, and methods to integrate said GFCI functionality with an equipment grounding system with monitoring function per UL requirements, are envisioned. One typical application may be large area outdoor sports lighting systems, however, any electrical system that is reliably grounded, that may expose persons to electrical shock hazards, and does not have the means to detect and disable said electrical shock hazards would likewise benefit.

The most obvious benefit of the envisioned GFCI functionality is personal protection from electrical shock hazards; however, additional benefits are realized. Cost savings are readily achieved by developing GFCI functionality integral to the electrical system, particularly when the electrical system has multiple circuits needing protection. Purchasing commercially available add-on GFCI devices for each circuit in the system, assuming appropriately rated GFCI devices are available for ballast-capacitor-lamp type loads—which may not be the case—may be cost-prohibitive. The data provided by active monitoring of the leakage current and grounding system may produce many benefits, including but not limited to: the data may serve as an early warning system that leakage current is increasing to unsafe levels and thus needs to be addressed, the data may show how leakage current varies with environmental conditions which may be used to tailor GFCI threshold levels, occurrence of nuisance tripping may be correlated to different operating conditions which may be used to tailor filtering processes, or other benefits.

It is therefore a principle object, feature, advantage, or aspect of the present invention to improve over the state of the art.

It is a further object, feature, advantage, or aspect of the present invention to solve problems and deficiencies in the state of the art.

These and other objects, features, advantages, or aspects of the present invention will become more apparent with reference to the accompanying specification.

In one aspect of the invention, a method of operating a high voltage, equipment-grounded electrical system having a single load circuit or a plurality of load circuits is disclosed comprising: (a) installing a GFCI functionality in the electrical system; (b) monitoring leakage current and equipment grounding of the electrical system; and (c) actively controlling the GFCI functionality based on the monitoring.

In another aspect of the invention, a method of operating a high voltage, equipment-grounded electrical system having a single load circuit or a plurality of load circuits is disclosed comprising: (a) detecting a current imbalance in any of the load circuits; (b) distinguishing between nuisance leakage current and fault current in the detected current imbalance according to predetermined factors; (c) disabling the load circuit for a fault current condition but not a nuisance leakage current condition.

In another aspect of the invention, a system is disclosed comprising: (a) at least one earth ground; (b) at least one equipment ground; (c) a monitoring subsystem for monitoring the equipment ground and/or earth ground; (d) a power subsystem circuit within the power control circuit which reestablishes power in the load circuit; and (e) optionally, one or more alarms which activate when the trip point is approached and/or exceeded.

Another aspect of the invention comprises integration of GFCI functionality along with controlling and monitoring functions in an equipment-grounded sports lighting system, such as that shown in FIG. 1A with a method or apparatus as described above. A partial block diagram of the electrical components in FIG. 1A can be found in FIG. 1B. With regards to FIG. 1B, the flow of electrical power to Pole A can generally be characterized by the following.

Electrical power flows from service distribution cabinet 30 to breaker A 31.

Power flows from breaker A 31 to control/contactor cabinet 40 via power line 21.

Electrical power in power line 21 reaches a control module 42 where it is directed to a contactor module A 41, and leaves contactor module A 41 via power line 21.

Control module 42 may be operated remotely via control center 90 with communications via an antenna 43.

Electrical power in power line 21 reaches pole cabinet 50 at Pole A where power passes through a disconnect switch 52, the current is regulated at a ballast 51, and lamp 61 is powered.

It is of note that for the sake of brevity, FIG. 1B shows a complete circuit for Pole A only; however, one skilled in the art would know similar circuitry exists for Poles B-D illustrated in FIG. 1A.

III. BRIEF DESCRIPTION OF THE DRAWINGS

From time-to-time in this description reference will be taken to the drawings which are identified by Figure number and are summarized below.

FIG. 2A illustrates the relationship between shutdown time, T, and trip point, I, for Class A and Class C GFCI devices.

Figure 3:
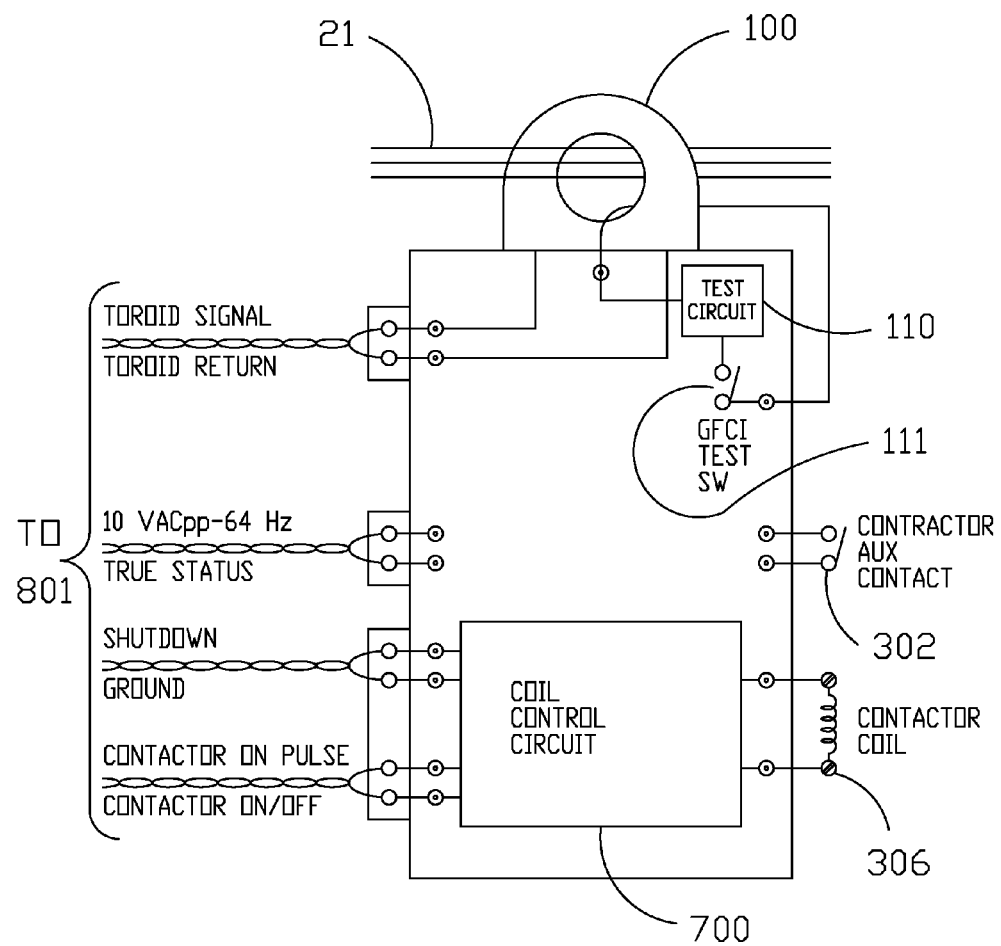

FIG. 3 diagrammatically illustrates the contactor control module, used in conjunction with FIGS. 4 and 5-8 to satisfy UL Class C GFCI functionality according to at least one aspect of the invention.

Figure 4:
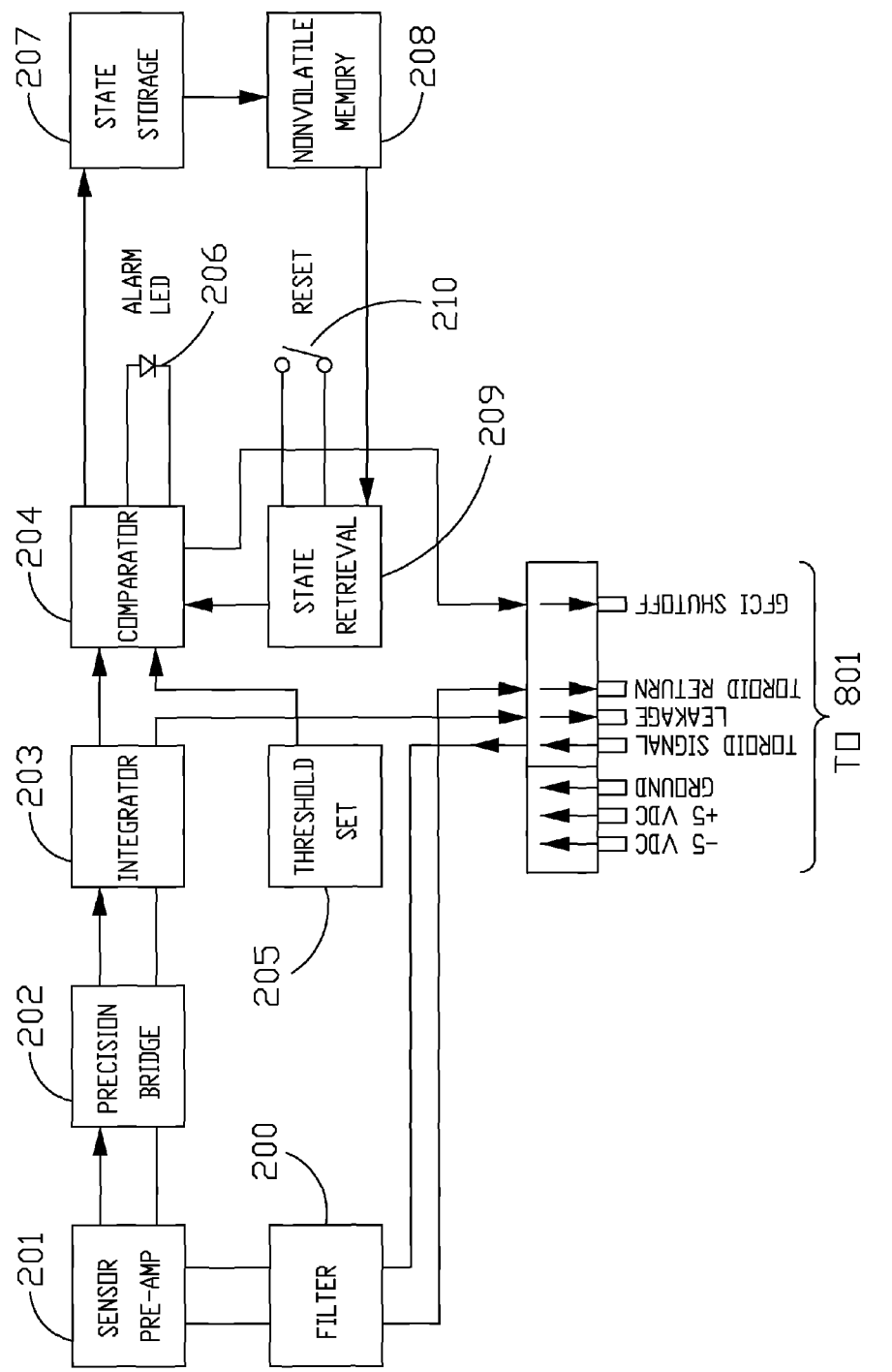

FIG. 4 illustrates a block diagram of the GFCI module, used in conjunction with FIGS. 3 and 5-8 to satisfy UL Class C GFCI functionality according to at least one aspect of the invention.

Figure 5:
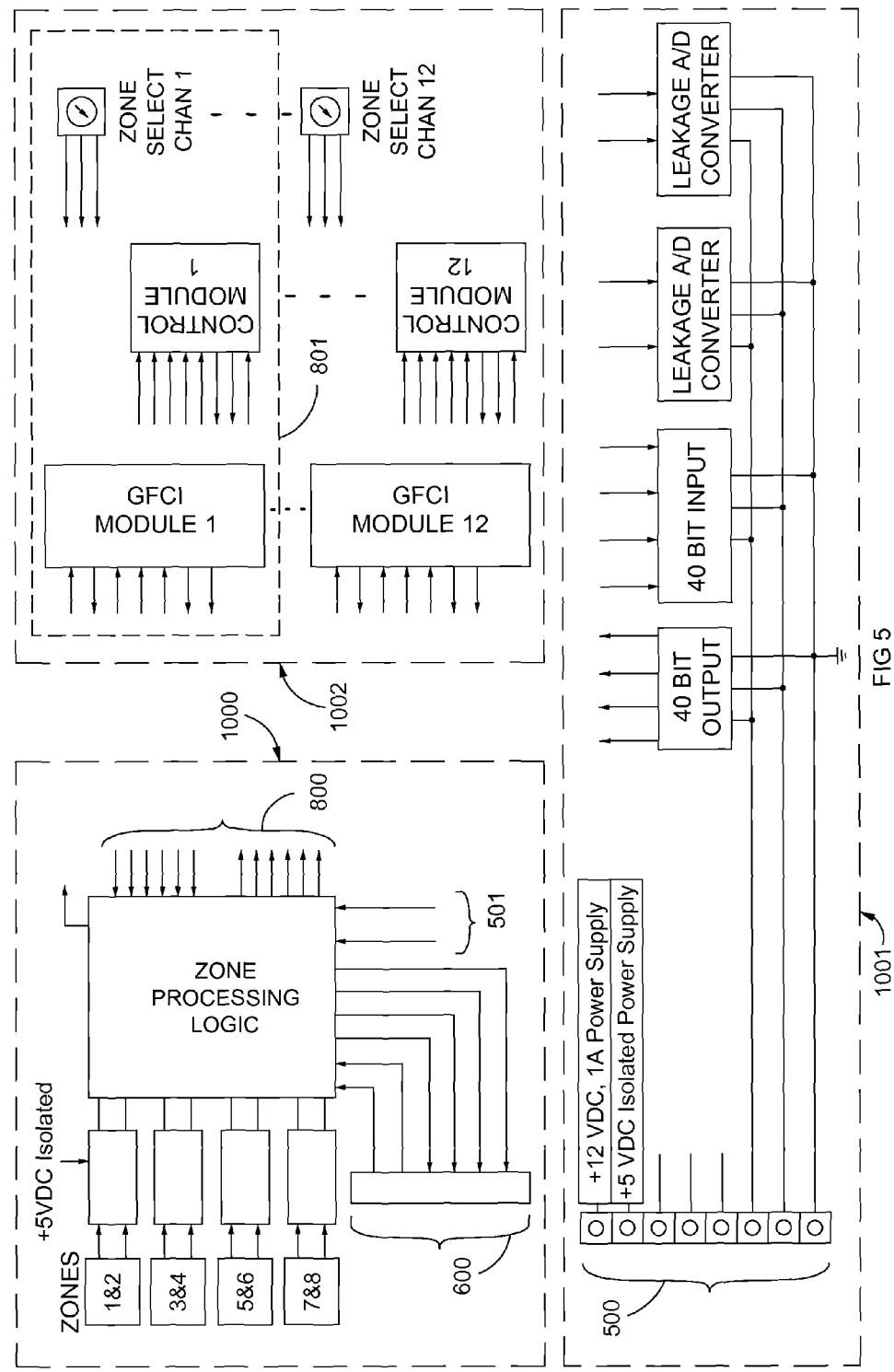
Figure 6:
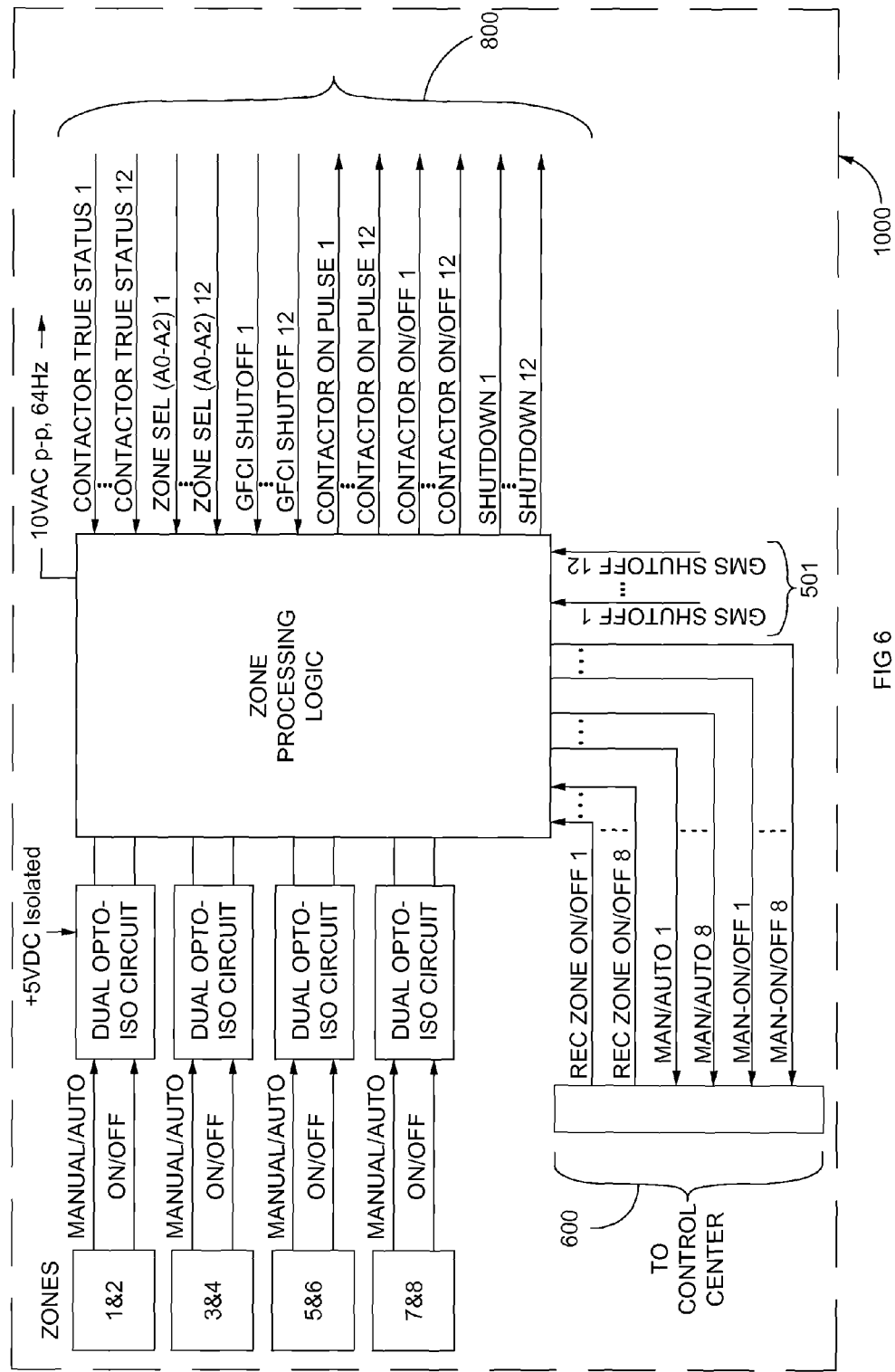
Figure 7:
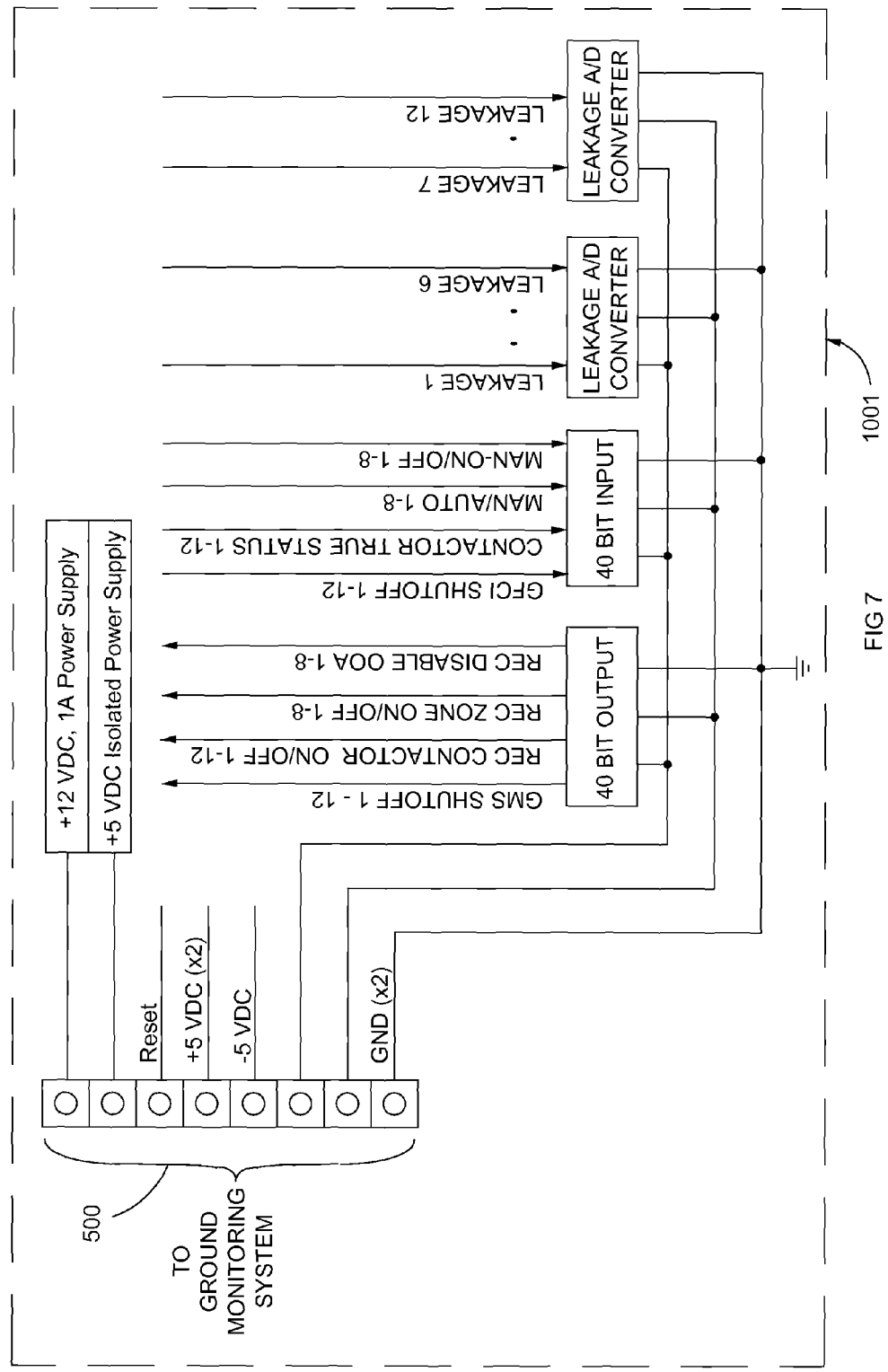
Figure 8:
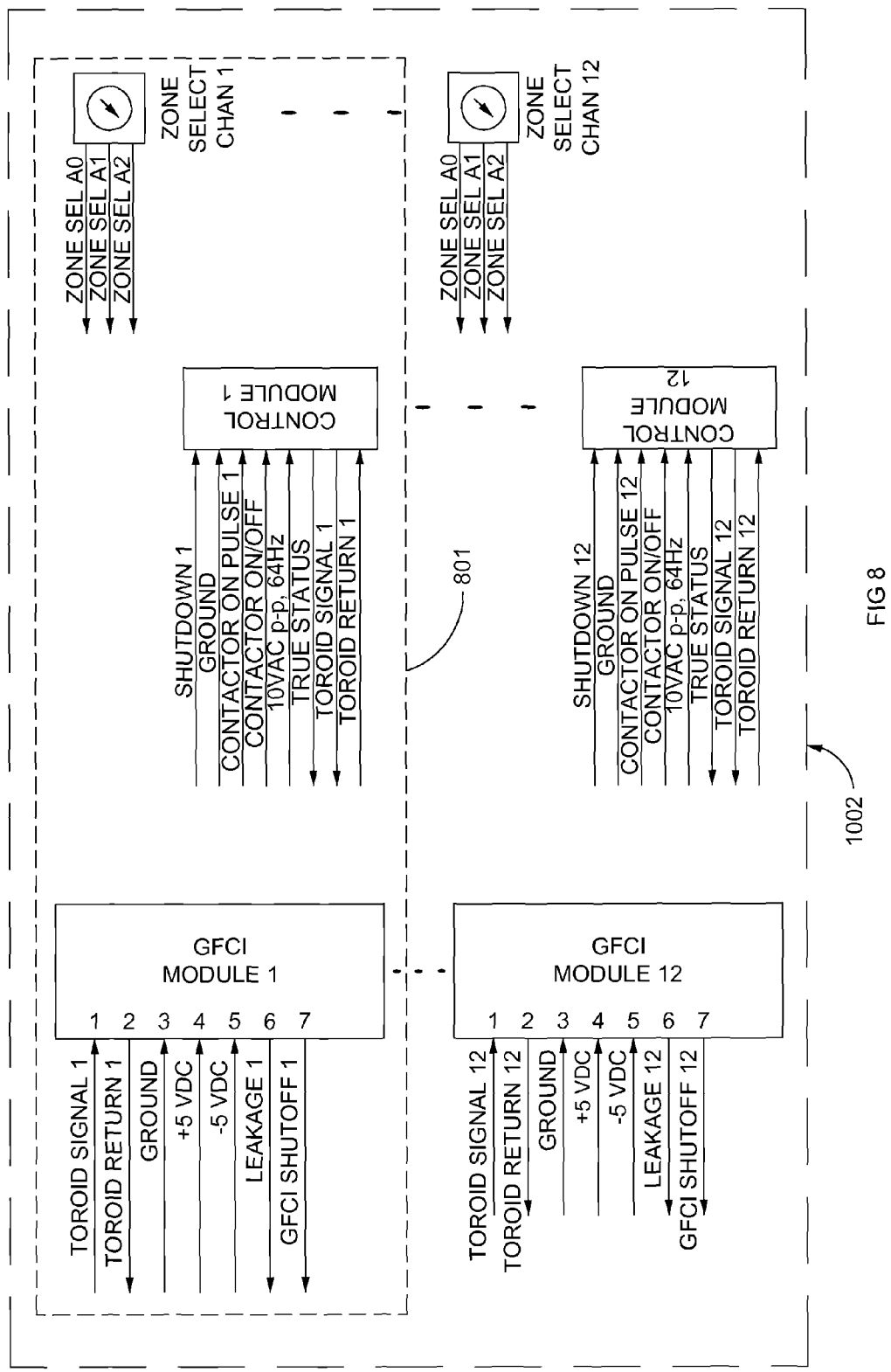

FIGS. 5-8 diagrammatically illustrates the processing module, used in conjunction with FIGS. 3 and 4 to satisfy UL Class C GFCI functionality according to at least one aspect of the invention. FIG. 6 illustrates section 1000 of FIG. 5 in greater detail, FIG. 7 illustrates section 1001 of FIG. 5 in greater detail, and FIG. 8 illustrates section 1002 of FIG. 5 in greater detail.

IV. DETAILED DESCRIPTION OF EXEMPLARY EMBODIMENTS

A. Overview

To further understanding of the present invention, specific embodiments according to the present invention will be described in detail. Frequent mention will be made in this description to the drawings. Reference numbers will be used to indicate certain parts in the drawings. The same reference numbers will be used to indicate the same parts throughout the drawings.

Figure 1A:
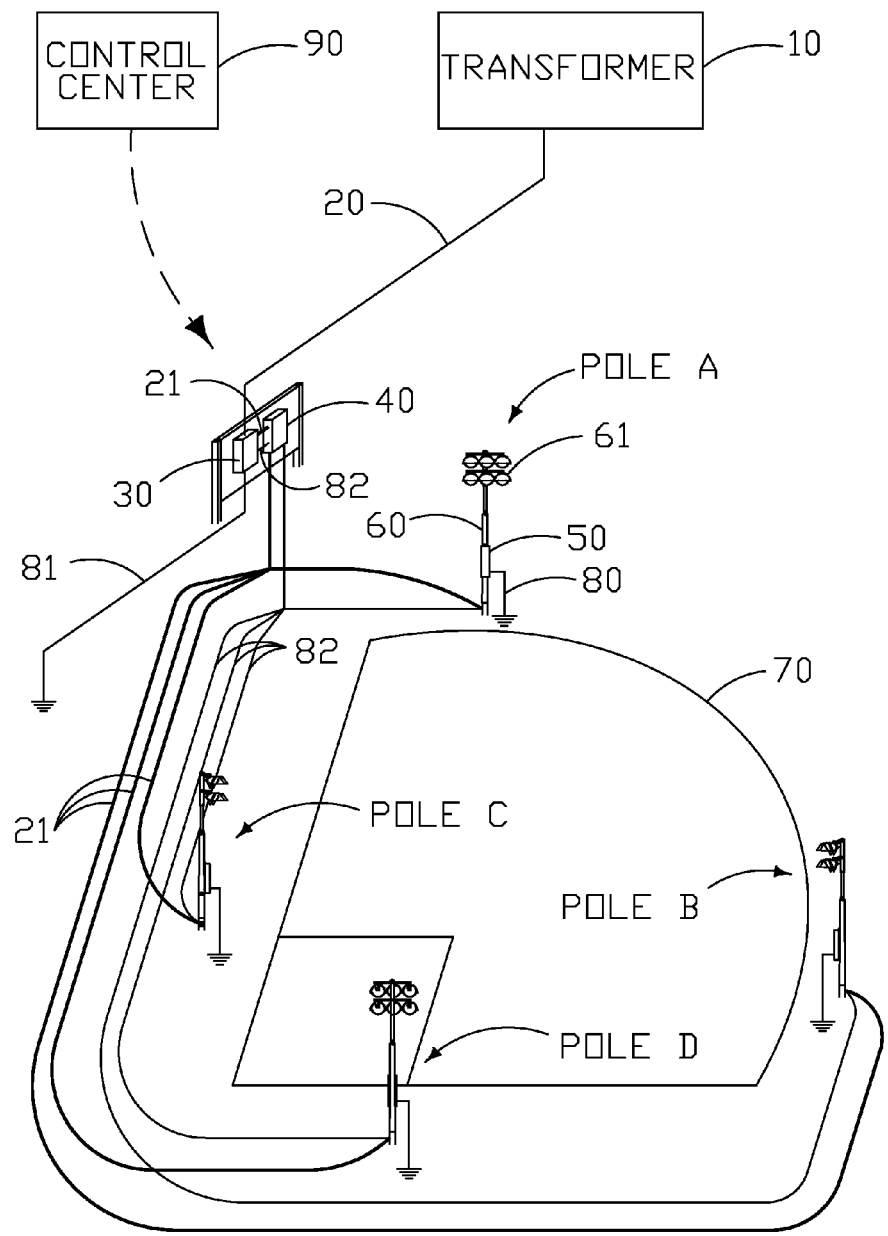
FIG. 1A illustrates a conventional sports lighting system with sports field, mounting structures, fixtures and controls.

The exemplary embodiment illustrates apparatus, method, and system for integrating UL Class C GFCI functionality in an equipment-grounded high voltage system, such as that generally used in sports lighting applications and illustrated in FIG. 1A. The exemplary embodiment addresses existing concerns in prior art; particularly nuisance tripping and shutdown time required by UL-943C. It is of note, however, that the exemplary embodiment, options, and alternatives described herein are by way of example and not by way of limitation.

It is also of note that to adhere to governing codes, the exemplary embodiment, options, and alternatives described herein assume a reliable equipment grounding system, where reliable equipment grounding is defined by UL as a grounding system or double insulation system that satisfies U.S. National Electric Code (NEC) 250.110 (6) and 250.114 (2). UL further states that the reliable equipment grounding system must have a ground monitoring function that will prevent more than a 150 volt voltage drop in the grounding circuit.

In accordance with aspects of the invention, the exemplary embodiment includes a combination of apparatus and method whereby leakage current in a high voltage electrical system with a ballast-capacitor-lamp type load may be monitored and electrical shock hazards from fault current may be mitigated in accordance with UL Class C requirements; the resulting system of which is a personal protection method integral to the system that, when coupled with reliable equipment grounding that is actively monitored, comprises a comprehensive electrical protection system.

1. Reliable Grounding System

As has been stated, UL-943C requires GFCI circuits maintain a reliable equipment grounding system that is actively monitored, where reliable grounding is defined by UL as a grounding system or double insulation system that satisfies U.S. National Electric Code (NEC) 250.110 (6) and 250.114 (2). UL-943C further requires that the reliable equipment grounding system must have a ground monitoring function that will prevent more than a 150 volt voltage drop in the grounding circuit. However, it is generally desirable for electrical systems such as that illustrated in FIG. 1A to maintain not only an equipment grounding system but also an earth grounding system to provide a path of low impedance such that electrical discharge from lightning or other sources at the poles may be dissipated to the earth with minimal damage to property or person. As a primary objective of aspects of the invention herein is to provide personal protection against electrical shock hazards, the exemplary embodiment, options, and alternatives described herein assume a reliable equipment grounding system that is actively monitored, as well as an earth grounding system.

As has been stated, equipment grounding techniques and monitoring methods that satisfy UL regulations may be such as is described in U.S. patent application Ser. No. 12/559,863, while earth grounding techniques may be such as is described in U.S. patent application Ser. No. 12/709,991. The exemplary embodiment, options, and alternatives described herein envision means and methods to combine developed GFCI functionality and leakage current monitoring with the grounding systems and monitoring methods as referenced; however, these are by way of example and not by way of limitation. Electrical systems with equipment grounding system, earth grounding system, and methods of monitoring said ground status that differ from those referenced would still benefit from the envisioned GFCI functionality.

2. Leakage Current Monitoring

A method according to one aspect of the invention comprises monitoring the leakage current of an electrical system with an existing equipment grounding system, and providing GFCI-type functionality to mitigate electrical shock hazards that arise from fault current conditions. Leakage current itself occurs naturally in many electrical systems and is not necessarily cause for alarm; potential sources may be differences in ballast manufacturing, capacitive coupling occurring in the long power lines running to the load, or imperfect insulation between conductors in the electrical system. A concern unique to ballast-capacitor-lamp loads, and not addressed by commercially available GFCI devices, is leakage current due to different operating phases encountered during normal operation of the lamp. The different phases encountered during normal operation of a ballast-capacitor-lamp type electrical system are well known in the art and can generally be characterized by the following.

Ignition phase—Initial power applied to the ballast-lamp circuit results in the high impedance lamp element transitioning to a lower impedance as the phase progresses.

Warm-up phase—The phase initiates immediately after ignition, and lasts until the lamp element reaches its stable operating temperature. During this phase the lamp circuit responds like a simple resistive load and measured imbalance leakage current appears as a sinusoidal wave.

Lamp operating phase—During the operating mode, measurement of the imbalance leakage current will differ in value and shape from the waveform measured during the warm-up phase.

Cool down phase—If the operating phase is terminated and power is restored to the lamp before it has reached the ignition phase temperature, the lamp undergoes a cool down phase until the ignition phase resumes. During this phase, measurement of the imbalance leakage current will differ in value and shape from both the warm-up phase and lamp operating phase since the lamp element is again in a high impedance state.

Leakage current measurements are generally considered the baseline (i.e. noise level) of an electrical system to which fault conditions are compared. For example, if the fault current for an electrical system is 30 mA, it is not uncommon to design for a leakage current measurement 30% of the fault current (i.e. 9 mA). Thus, it is beneficial to actively monitor the leakage current in an electrical system, such as that illustrated in FIG. 1A, such that increases in leakage current may be addressed and the desired difference between leakage current and fault current (i.e. peak-to-noise ratio) may be maintained. For example, suppose the fault current for an electrical system is 30 mA and the electrical system has been designed for system leakage current of 9 mA. The peak-to-noise ratio in this case is ~3.3:1, which allows for fault conditions to be readily identified. Now suppose environmental conditions or a breakdown in conductor insulation causes the system leakage current to increase to 20 mA. The peak-to-noise ratio in this alternate case is 1.5:1, which may not be significant enough to correctly identify all fault conditions.

B. Exemplary Method and Apparatus Embodiment 1

Figure 1B:
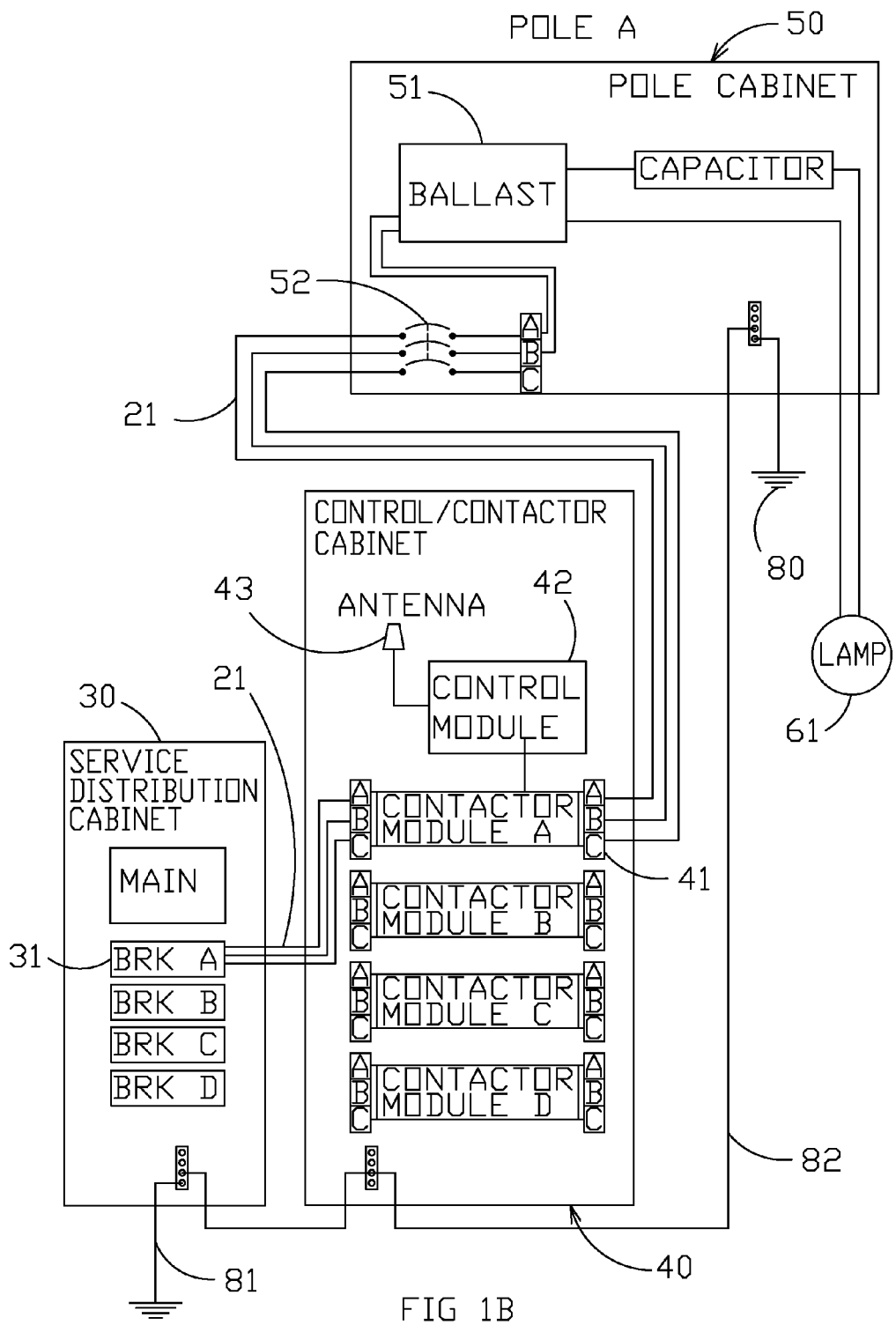
FIG. 1B illustrates a partial block diagram of the electrical enclosures in FIG. 1A.
Figure 2B:
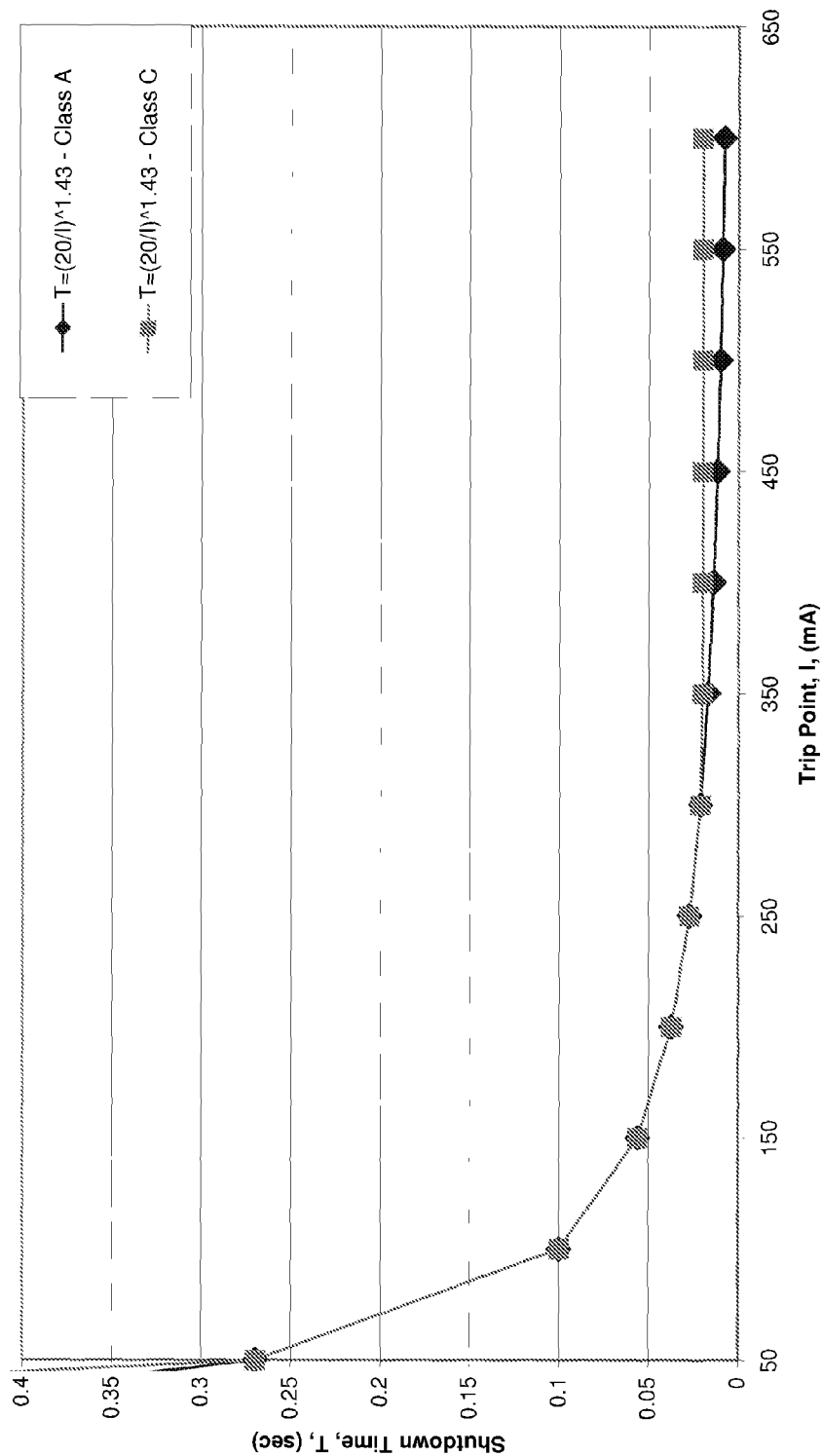
FIG. 2B illustrates the relationship between shutdown time, T, and trip point, I, for Class A and Class C GFCI devices; extended x-axis.

Per UL-943C, a reliably equipment-grounded electrical system, such as is illustrated in FIGS. 1A and 1B, is enabled with equipment ground monitoring capabilities and GFCI functionality. GFCI functionality is such that the minimum trip point per UL-943C is detected and the specific contactor providing power to the pole where the trip point occurs may be disabled within the minimum shutdown time per UL-943C, while minimizing nuisance tripping. Said electrical system is enabled with a contactor control module as is shown in FIG. 3, GFCI module as is shown in FIG. 4, and processing module as is shown in FIGS. 5-8 (FIG. 5 illustrates an overview of the processing module and FIGS. 6-8 illustrate details of portions of the processing module). It is of note that for the sake of brevity only one module each is shown in FIGS. 3 and 4, however, one skilled in the art would know that for the system illustrated in FIG. 1A with four circuits and four contactors (see FIG. 1B), four modules each of FIGS. 3 and 4 would be required.

Contactor Control Module

With respect to FIG. 3, the contactor control module comprises:

A toroid 100 through which power lines 21 run to and from the load and imbalances in current are measured;
  Toroid 100 is made of a tape wound nickel core.
  Toroid 100 attenuates signals above 2 kHz.
A test circuit 110 activated via a test switch 111;
  When activated, test circuit 110 forces an AC current of sufficient magnitude through toroid 100 such that the trip point is exceeded and a coil control circuit 700 terminates power to a contactor coil 306, which in turn disables the contactor (see reference no. 41, FIG. 1B).
Coil control circuit 700 which controls power to contactor coil 306; and
  Contactor coil 306 is modified to remove flux shunts on the core in combination with a low voltage AC coil, driven by a pulse width modulated (PWM) DC signal.
  Coil control circuit 700 receives the following commands from the processing module (see also FIGS. 5-8):
    Shutdown command via the shutdown input;
    Power command via the contactor on/off input; and
    Start-up pulsing command via the contactor on pulse input.
  Modification of contactor coil 306 combined with the PWM drive significantly reduces shutdown time over commercially available AC coil drives.
A contactor auxiliary contact switch 302 which indicates the status of the coil control circuit 700.
  Auxiliary contact 302 is powered by a 10 VACpp-64 Hz input and produces feedback to the processing module and the ground monitoring system (GMS) via the contactor true status feedback output (see also FIGS. 5-8).

GFCI Module

With respect to FIG. 4, the GFCI module comprises:

Input from toroid 100;
  Input from toroid 100 produces a linear response for AC current in the ranges of 50 Hz-2 kHz, 2 mA-100 mA.
A filter 200 which filters out undesired frequencies;
A sensor pre-amp 201 which stabilizes and amplifies the signal;
  A low pass filter in the feedback circuit of the pre-amp prevents the pre-amp from being overdriven.
A precision bridge 202 which rectifies the signal, producing a fully positive waveform signal;
An integrator 203 which tracks and measures energy of peaks in the rectified signal;
  The resulting signal is sent to a comparator 204 and to the GMS via the leakage output (see also FIGS. 5-8).
Comparator 204 which compares the output from integrator 203 versus a threshold 205 and produces a state change (normal/alarm);
  Upon a state change in comparator 204, a signal is provided to a visual alarm 206, a state storage 207; and the processing module and GMS via GFCI shutoff output (see also FIGS. 5-8).

State storage 207 which collects the state output from comparator 204 and stores it in a nonvolatile memory 208; and A state retrieval 209 which, upon pressing of reset switch 210 or restoring of power after a failure, collects the state from nonvolatile memory 208 and provides the correct state input to comparator 204.

Processing Module

With respect to FIGS. 5-8, the processing module comprises:

Zone processing logic (see reference no. 1000) by which multiple zones (shown by example and not by way of limitation as eight in FIGS. 5-8) housing multiple contactor channels (shown by example and not by way of limitation as twelve in FIGS. 5-8) may be controlled.

The zone processing logic receives input and produces output to the GFCI module and contactor control module at a junction 800, the functions of which are outlined in box 801 for one of the twelve channels.

The zone processing logic receives input and produces output to control center 90 (FIG. 1A) via a junction 600 for remote monitoring and data acquisition of each zone.

The zone processing logic receives input from the GMS via a junction 501 for GMS status of each channel.

The GMS also receives inputs from the GFCI and contactor control modules 801 (see reference no. 1002), as was previously described and is illustrated in FIGS. 3 and 4. Inputs from 801 are included in junction 500 (see reference no. 1001), which allows an existing equipment grounding system that is actively monitored (per UL requirements) to be integrated with the envisioned GFCI functionality.

C. Options and Alternatives

As mentioned previously, the invention can take many forms and embodiments. The foregoing examples are but a few of those. To give some sense of some options and alternatives, a few examples are given below.

An alternative approach to measuring current imbalances may focus on separating the leakage current that is capacitively coupled from the fault current which is in phase with the voltage. As previously stated, leakage current may be due to differences in ballast manufacturing, capacitive coupling occurring in the long power lines running to the load, imperfect insulation between conductors in the electrical system, or due to the different operating phases encountered during normal operation of a lamp, for example. In this alternative approach to measuring current imbalance, the 90° phase-shifted capacitively coupled leakage current may be factored out and only in phase fault current may be compared to the trip point.

As envisioned, the GFCI functionality and equipment ground status are actively monitored. The data from said monitoring may be used to comprise a system history by which immunity to nuisance tripping may be tailored. For example, after sufficient data was collected it may be possible to ascertain the number of nuisance trips and correlate the occurrences to variables not originally taken into account for leakage current measurement; harmonics, static electricity discharges, and inductive load switching are some such variables. It is of note that, as envisioned, data from said monitoring would be collected and maintained by the aforementioned CONTROL-LINK® system. However, alternate means of data collection and remote control of the electrical system may be utilized.

As was illustrated in FIGS. 3 and 4 there are a plurality of switches and alarms intended to ensure the integrity of the electrical protection system and give a visual indication of fault conditions. The physical location of switches and alarms may differ from the exemplary embodiment, provided functionality remains the same. For example, in addition to the alarm illustrated in FIG. 4 an alarm condition signal could be sent through control module 42 via antenna 43 to control center 90. Once control center 90 receives the alarm condition signal, the customer may be contacted and notified of the fault condition. Additionally, the switches as envisioned require manual intervention to reset. As a further option, switches may automatically reset after a fault condition occurs. If the fault condition persists, power to the contactors would be removed as is described in the exemplary embodiment and the automatic reset would not be successful. An automatic reset function may be preferable such that false trips not mitigated by aspects of the invention described herein may still be mitigated with minimal human intervention.

As was illustrated in FIG. 4, comparator circuit 204 compares the leakage current reading from toroid 100 to a threshold limit. As envisioned, the threshold limit is a fixed value. However, threshold set 205 may be enabled such that the threshold level may be variable. A variable threshold level may be preferable such that environmental conditions could be addressed (such as wet ground conditions versus dry ground conditions), changes in anticipated leakage current could be made (such as changing the type of load), or otherwise.

As an option, additional GFCI functionality could be added to the exemplary embodiment with a trip point higher or lower than that defined by UL-943C such that troubleshooting may be performed. For example, assume there may be an undiagnosed source of fault current in the underground wiring of FIG. 1A. By enabling an optional GFCI functionality with a trip point of 30 mA, to be used only after the original 20 mA trip point was exceeded, a test could be run to determine if the source of fault current was not in the pole, but in the underground wiring. Alternatively, a power supply/switch combination could be installed; with this option, power is directly applied to contactor coil 306, forcing operation of the system despite exceeding the 20 mA trip point, which also allows for troubleshooting.

As has been stated, leakage current may be encountered during different operating phases of the lamp. To maintain a desired peak-to-noise ratio during said operating phases a control signal may be input (whether automatically or by the user) into the GFCI module illustrated in FIG. 4 prior to amplification 201 such that the control signal will attenuate amplification 201 for the duration of the operating phase.

In addition to the filtering processes illustrated in FIG. 4, additional measures may be taken to mitigate line voltage effects that may result in a leakage current spike. For example, output from toroid 100 may be disabled when power to the lighting support structure, 60 is terminated. Further, output from the toroid 100 may be disabled during periods where noise levels are high due to normal operating conditions, such as the ignition phase of the lamp (see reference no. 61). For example, when contactor coil 306 is powered, coil control circuit 700 could send a signal to disable output from toroid 100 until the high noise portion of the ignition phase is complete. Alternatively, measures may be taken to mitigate line voltage effects that may result in a leakage current spike before the toroid detects said current. For example, each of the three-phase power line conductors on the output of contactor 41 may be monitored via optical isolator circuit (or analogous device) and when a voltage spike occurs, a signal could be sent to disable output from toroid 100 in the manner described above or otherwise.

The physical location of the electrical protection system as illustrated in FIGS. 3-8 for an electrical system such as that illustrated in FIG. 1A may vary. For example, the electrical protection system may be installed in control/contactor cabinet 40, allowing for easy access. Alternatively, the electrical protection system may be installed in pole cabinet 50 for each pole in the electrical system. This option may be preferable for pole cabinets that house more than one circuit, as is sometimes common in sports lighting applications. By housing the electrical protection system at pole cabinet 50 only one set of power lines 21 could be run to the enclosure. If the electrical protection system was installed in control/contactor cabinet 40, multiple sets of power lines 21 would likely be run to pole cabinet 50. Flexibility in installing the electrical protection system as illustrated in FIGS. 3-8 gives rise to the possibility of retrofitting older electrical systems such that GFCI functionality could be provided without substantial system redesign.

What is claimed is:

1. A method of operating a high voltage equipment grounded electrical system having a single load circuit or a plurality of load circuits and an earth grounding system for each of said load or loads comprising:
   a. installing a GFCI functionality to the electrical system;
   b. monitoring a leakage current, the earth grounding, and an equipment grounding of tile electrical system; and
   c. actively controlling the GFCI functionality based on the monitoring.

2. The method of claim 1 wherein the monitoring is performed on-site.

3. The method of claim 1 wherein the monitoring is performed from a remote location.

4. The method of claim 3 further comprising controlling the GFCI functionality from a remote location.

5. A method of operating a high voltage equipment grounded electrical system having a single load circuit or a plurality of load circuits comprising:
   a. detecting a current imbalance in any of the load circuits;
   b. distinguishing between a nuisance leakage current and a fault current in the detected current imbalance according to predetermined factors;
   c. maintaining at least a minimum peak-to-noise ratio during operation of the high voltage, equipment-grounded electrical system wherein said minimum peak-to-noise ratio is one of said predetermined factors; and
   d. disabling the load circuit for a fault current condition but not a nuisance leakage current condition.

6. The method of claim 5 further comprising storage of the detected current imbalances.

7. The method of claim 6 further comprising comparing stored current imbalances over time to detect trends.

8. The method of claim 7 further comprising generating an alarm or notification based on a detected trend.

9. The method of claim 5 wherein the distinguishing between nuisance leakage current and fault current comprises not detecting current imbalance when the imbalance is expected to be high because of (a) normal operation, (b) environmental conditions, and/or (c) known system errors.

10. The method of claim 5 wherein the high voltage, equipment-grounded electrical system comprises a wide area lighting system and wherein the load circuits comprise one or more of (a) ballast, (b) capacitor, and (c) lamp for wide area lighting fixtures.

11. The method of claim 5 wherein the detecting a current imbalance comprises separating the current that is capacitively coupled from the current that is in phase with an operating voltage.

12. A GFCI-type functionality for a high voltage electrical system comprising:
   a. a current sensing circuit for sensing imbalances in current in at least one load circuit of the electrical system;
   b. a power control circuit for shutting down power in response to a trip point condition, the power control circuit comprising:
      i. an input from the current sensing circuit;
      ii. a comparator for comparing the input to the trip point for the load circuit; and
      iii. a shutoff circuit which terminates power to the load circuit within a predetermined time in response to the input approaching and/or exceeding the trip point.

13. The system of claim 12 wherein the GFCI-type functionality meets UL 943C requirements.

14. The system of claim 12 further comprising:
   a. at least one earth ground;
   b. at least one equipment ground;
   c. a monitoring subsystem for monitoring the equipment ground and/or earth ground;
   d. a power subsystem circuit within the power control circuit which reestablishes power in the load circuit; and
   e. optionally, one or more alarms which activate when the trip point is approached and/or exceeded.

15. A GFCI-type functionality for a high voltage electrical system comprising:
   a. a current sensing circuit for sensing imbalances in current in at least one load circuit of the electrical system;
   b. a power control circuit for shutting down power in response to a trip point condition, the power control circuit comprising:
      i. an input from the current sensing circuit;
      ii. a comparator for comparing the input to the trip point for the load circuit; and
      iii. a shutoff circuit which terminates power to the load circuit within a predetermined time in response to the input approaching and/or exceeding the trip point; and
   c. a test circuit for introducing current into the load circuit after the trip point is exceeded for purposes of testing the GFCI functionality and/or troubleshooting.

16. The system of claim 15 wherein the power control distinguishes between nuisance leakage current conditions and fault current conditions.

17. The system of claim 12 wherein the electrical system includes a plurality of high intensity wide area light sources.

18. The system of claim 17 wherein the light sources comprise sports lighting fixtures.

19. The method of claim 7 further comprising modifying the peak-to-noise ratio based on a detected trend.

20. A method of operating a high voltage equipment grounded electrical system having a single load circuit or a plurality of load circuits comprising:
   a. detecting a current imbalance in any of the load circuits, wherein the detecting a current imbalance comprises separating the current that is capacitively coupled from the current that is in phase with an operating voltage;
   b. distinguishing between a nuisance leakage current and a fault current in the detected current imbalance according to predetermined factors;
   c. disabling the load circuit for a fault current condition but not a nuisance leakage current condition.

* * * * *

UNITED STATES PATENT AND TRADEMARK OFFICE
CERTIFICATE OF CORRECTION

PATENT NO. : 8,320,089 B1  
APPLICATION NO. : 12/750377  
DATED : November 27, 2012  
INVENTOR(S) : Darrell N. Chelcun Page 1 of 1

It is certified that error appears in the above-identified patent and that said Letters Patent is hereby corrected as shown below:

Col. 11, line 31, "tile" should be changed to --the--.

Signed and Sealed this
Twenty-second Day of January, 2013

David J. Kappos
*Director of the United States Patent and Trademark Office*